US007009643B2

(12) United States Patent
Nakamura et al.

(10) Patent No.: US 7,009,643 B2
(45) Date of Patent: Mar. 7, 2006

(54) AUTOMATIC DETERMINATION OF IMAGE STORAGE LOCATION

(75) Inventors: Kaoru Nakamura, Irvine, CA (US); Donald P. Gibson, Yorba Linda, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 10/098,134

(22) Filed: Mar. 15, 2002

(65) Prior Publication Data

US 2004/0201740 A1 Oct. 14, 2004

(51) Int. Cl.
*H04N 5/76* (2006.01)
*G10L 17/00* (2006.01)

(52) U.S. Cl. .............................. 348/231.4; 348/231.3; 348/207.1; 704/246

(58) Field of Classification Search ............. 348/231.3, 348/232, 207, 300, 310, 319, 429, 231.2, 348/239.5, 231.4, 231.5, 231.6, 270.1; 707/100; 704/246
See application file for complete search history.

(56) References Cited

U.S. PATENT DOCUMENTS

| | | | | |
|---|---|---|---|---|
| 5,633,678 A | * | 5/1997 | Parulski et al. ............ | 348/231.5 |
| 5,995,936 A | * | 11/1999 | Brais et al. ................. | 704/275 |
| 6,160,964 A | | 12/2000 | Imoto ........................... | 396/300 |
| 6,804,652 B1 | * | 10/2004 | Shaffer ........................ | 704/270 |
| 6,862,038 B1 | * | 3/2005 | Anderson .................... | 348/207.99 |
| 2002/0101519 A1 | * | 8/2002 | Myers ........................... | 348/232 |
| 2003/0009469 A1 | * | 1/2003 | Platt et al. .................... | 707/100 |

FOREIGN PATENT DOCUMENTS

EP 1004967 5/2000

OTHER PUBLICATIONS

U.S. Appl. No. 09/770,295, filed Jan. 29, 2001.

* cited by examiner

*Primary Examiner*—David L. Ometz
*Assistant Examiner*—Lin Ye
(74) *Attorney, Agent, or Firm*—Fitzpatrick, Cella, Harper & Scinto (57) ABSTRACT

Automatic determination of image storage location based on comparing information contained in a data source against image metadata that is stored along with the image. The data source contains information such as date events like birthdays, and anniversaries, location information such as information pertaining to planned trips and conferences, voice recordings, and other information on which basis images can be organized. The information contained in the data source is compared against the image metadata that includes such information as the location of the image, creation date of the image, and audio annotations. Images corresponding to the same event are stored in the same location and are identified by title of the event provided in the data source. Images for which no event title is provided are stored in a default location and identified by a the date images are stored.

12 Claims, 6 Drawing Sheets

October 29 - November 02

| | October 2001 | November 2001 |
|---|---|---|
| | S M T W T F S | S M T W T F S |
| |   1 2 3 4 5 6 |          1 2 3 |
| | 7 8 9 10 11 12 13 | 4 5 6 7 8 9 10 |
| | 14 15 16 17 18 19 20 | 11 12 13 14 15 16 17 |
| | 21 22 23 24 25 26 27 | 18 19 20 21 22 23 24 |
| | 28 29 30 31 | 25 26 27 28 29 30 |

|  | Mon, Oct 29 | Tue Oct 30 | Wed, Oct 31 | Thu, Nov 01 | Fri, Nov 02 |
|---|---|---|---|---|---|
| 7 am | | | | | |
| 8 00 | | | | | |
| 9 00 | | | | | |
| 10 00 | | | | | |
| 11 00 | | | School Holloween Party | | |
| 12 pm | Family Picnic in Newport Beach | | | John's Birthday Party | |
| 1 00 | | | | | |
| 2 00 | | | | | |
| 3 00 | | | Dana Point Sailing Class | | Japan Vacation |
| 4 00 | | | | | |
| 5 00 | | | | | |
| 6 00 | | | | | |

*FIG. 5*

| IMAGE FILE | METADATA |
|---|---|
| IMG0001 | 2001:10:29 12:20:49 p.m. |
| IMG0002 | 2001:10:29 12:21:17 p.m. |
| IMG0003 | 2001:10:30 04:58:02 p.m. |
| IMG0004 | 2001:11:02 02:14:51 p.m. |
| IMG0005 | 2001:11:02 04:05:06 p.m. |
| IMG0006 | 2001:11:02 05:57:31 p.m. |

FIG. 6

AUTOMATIC DETERMINATION OF IMAGE STORAGE LOCATION

BACKGROUND OF THE INVENTION

1. Field of the Invention

The invention relates to storing digital images. More particularly, the invention relates to automatic determination of storage location for a digital image based on image metadata and information contained in a data source.

2. Description of the Related Art

In recent years digital cameras have become increasingly popular with the consuming public as their quality has become competitive with traditional film-based cameras and prices have continued to decrease. Digital cameras provide the user with many advantages over traditional units, including artistic control over the images, ability to take numerous pictures without being concerned about the cost of film, and the on-demand ability to print out just those pictures that are desired.

Consumers may also prefer digital cameras because of their preference for electronic organization of images over the traditional creation of physical albums. This may be due to a number of reasons such as the ability to send the electronic album to anyone without worrying about it being lost or damaged, and the ability to publish electronic photo albums on the Internet for general access.

Under systems currently in use, digital images are organized by downloading such images into a computer device and manually organizing the images into files and folders (albums) that are then given appropriate titles by the user. Typically the user needs to arrange the images individually into groups that correspond to a specific theme or event. As digital cameras have enabled the consumer to take more pictures at a reduced cost, there has been increased demand for a way to organize these digital images that is simple and requires a minimum amount of effort.

SUMMARY OF THE INVENTION

The present invention addresses the foregoing needs and provides for automatic organization of digital images by reference to information contained in a data source.

In one aspect, the invention automatically determines a storage location of a digital image based on image metadata and information contained in a data source. Image metadata is essentially non-picture data that is stored along with picture information in a file and can include such information as the date and time the picture was taken, whether a flash was used, which camera model was used, camera settings such as zoom and exposure, location information such as GPS-derived data, and audio annotations.

The data source can be any collection of information against which image metadata can be compared or tested, and on which basis image files may be organized. Such information includes, for example, date information like birthdays, vacations and anniversaries, location information such as those corresponding to a vacation event, or those pertaining to street addresses of towns and cities, and audio recordings of individuals collected in a recording media such as a cassette tape.

Images are organized by comparing or testing information contained in the data source pertaining to a particular theme or event against image metadata such as the date and location of the image. Images that correspond to the same theme or event are stored in the same location and are identified by the title of the corresponding event or theme provided in the source data. A default title, such as the event date, is used for images for which no title is provided in the data source. Images whose metadata does not match the information contained in the data source are stored in a default location.

Because the storage location is determined automatically, preferably during download of image from camera to computer in which albums are stored, a user does not need to remember to make photo albums from images that were downloaded at an earlier time.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
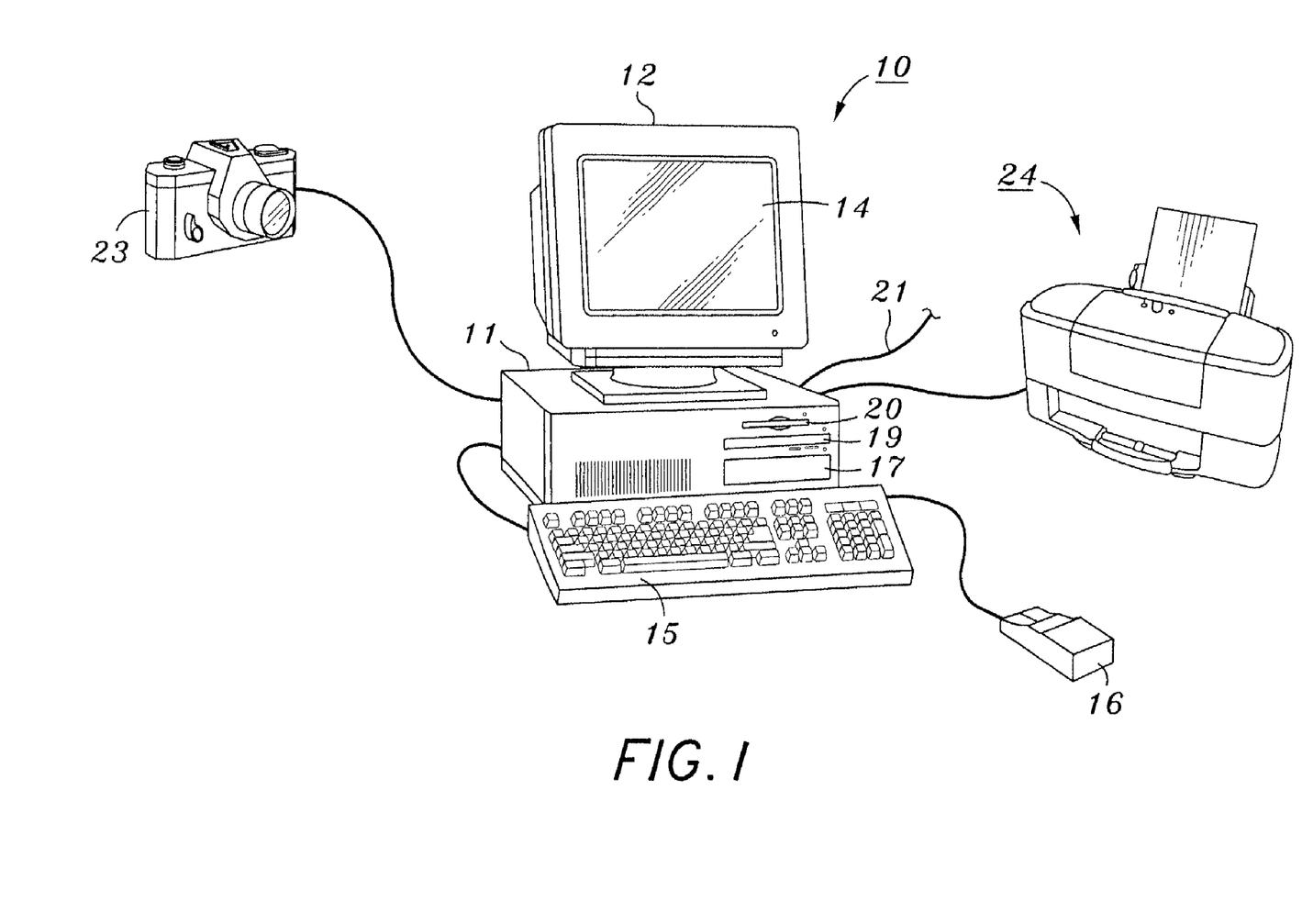
FIG. 1 is a view illustrating the outward appearance of an embodiment of the present invention.

FIG. 1 is a view showing the outward appearance of a representative embodiment of the invention. Computing equipment 10 includes host processor 11 comprising a personal computer (hereinafter "PC") preferably having a windowing operating system such as Microsoft Windows, Xwindows or MacIntosh operating systems. Provided with the computing equipment 10 are color monitor 12 including display screen 14, keyboard 15 for entering text data and user commands, and pointing device 16. Pointing device 16 preferably comprises a mouse, for pointing, selecting and manipulating objects displayed on display screen 14.

Computing equipment 10 includes a computer-readable memory medium such as a fixed disk 17 and/or floppy disk drive 19 and/or CD-ROM drive 20. Such computer readable memory media allow computing equipment 10 to access information such as image data, computer executable process steps, application programs, and the like, stored on removable and non-removable memory media. In addition, network access 21 allows computing equipment 10 to acquire information, images and application programs from other sources, such as a local area network or the Internet.

Image capture device, such as a digital camera or a digital video camera 23, captures original images and transmits them to computing equipment 10. Printer 24 is a color output device such as an ink jet printer or a color laser beam printer, for example.

Figure 2:
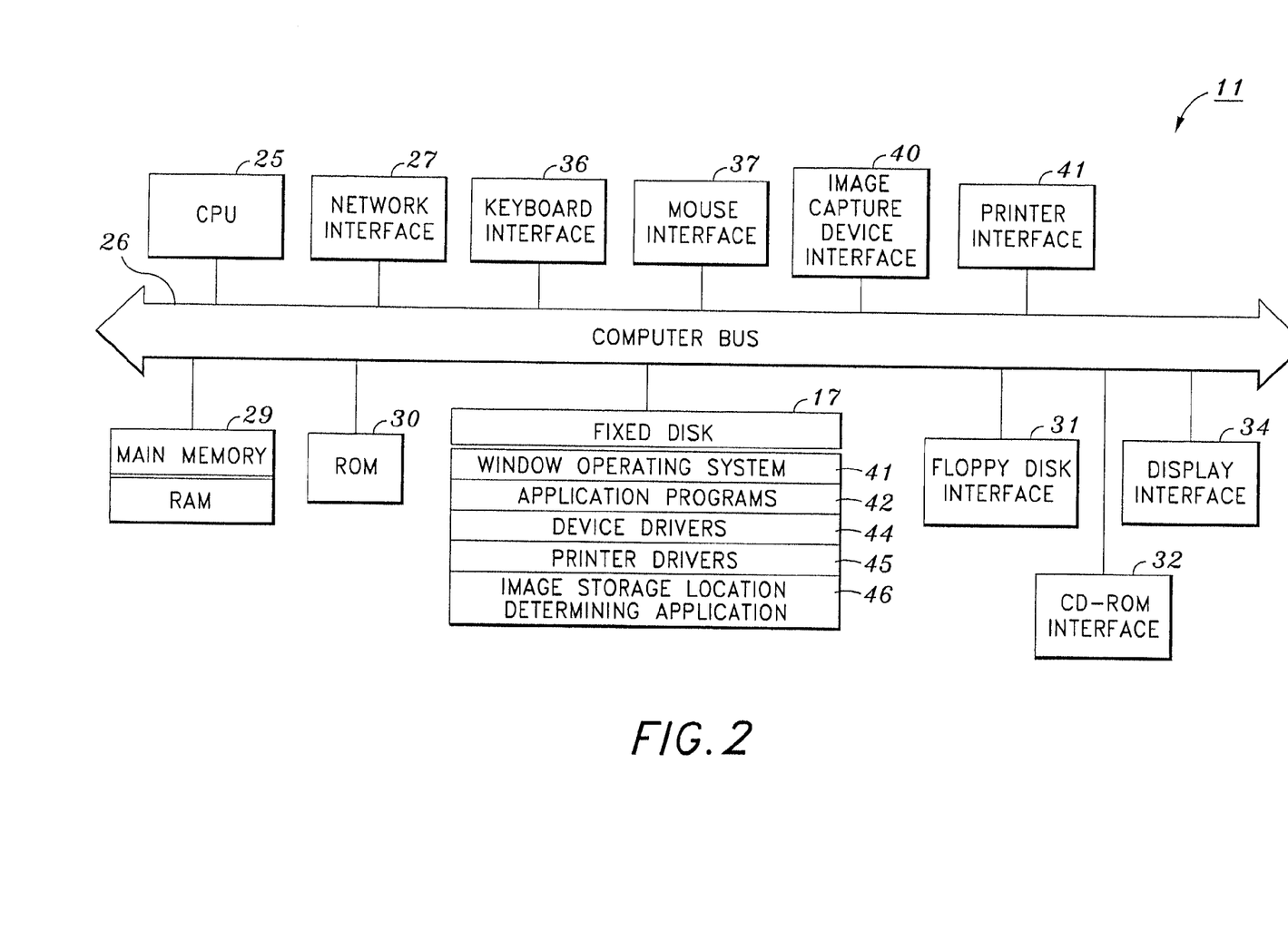
FIG. 2 is a detailed block diagram of the computing equipment shown in FIG. 1.

FIG. 2 is a detailed block diagram showing the internal architecture of PC 11. As shown in FIG. 2, PC 11 includes central processing unit ("CPU") 25 that interfaces with computer bus 26. Also interfacing with computer bus 26 are fixed disk 17, network interface 27 for network access 21, random access memory ("RAM") 29 for use as main memory, read only memory ("ROM") 30, floppy disk interface 31, CD-ROM interface 32, display interface 34 to monitor 12, keyboard interface 36 to keyboard 15, mouse interface 37 to pointing device 16, image capture device interface 40 to image capture device 23, and printer interface 41 to printer 24.

Main memory 29 interfaces with computer bus 26 so as to provide RAM storage to CPU 25 during execution of software programs such as the operating system, application programs, and device drivers. More specifically, CPU 25 loads computer-executable process steps from disk 17 or other memory media into a region of main memory 29, and thereafter executes the stored process steps from main memory 29 in order to execute software programs. Data such as image data can be stored in main memory 29, where the data can be accessed by CPU 25 during execution.

Fixed disk 17 contains a windowing operating system 41, device drivers 44 such as printer driver 45, and application programs 42 such as the inventive application that automatically determines a storage location for images stored in a file in accordance with the invention 46.

Figure 3:
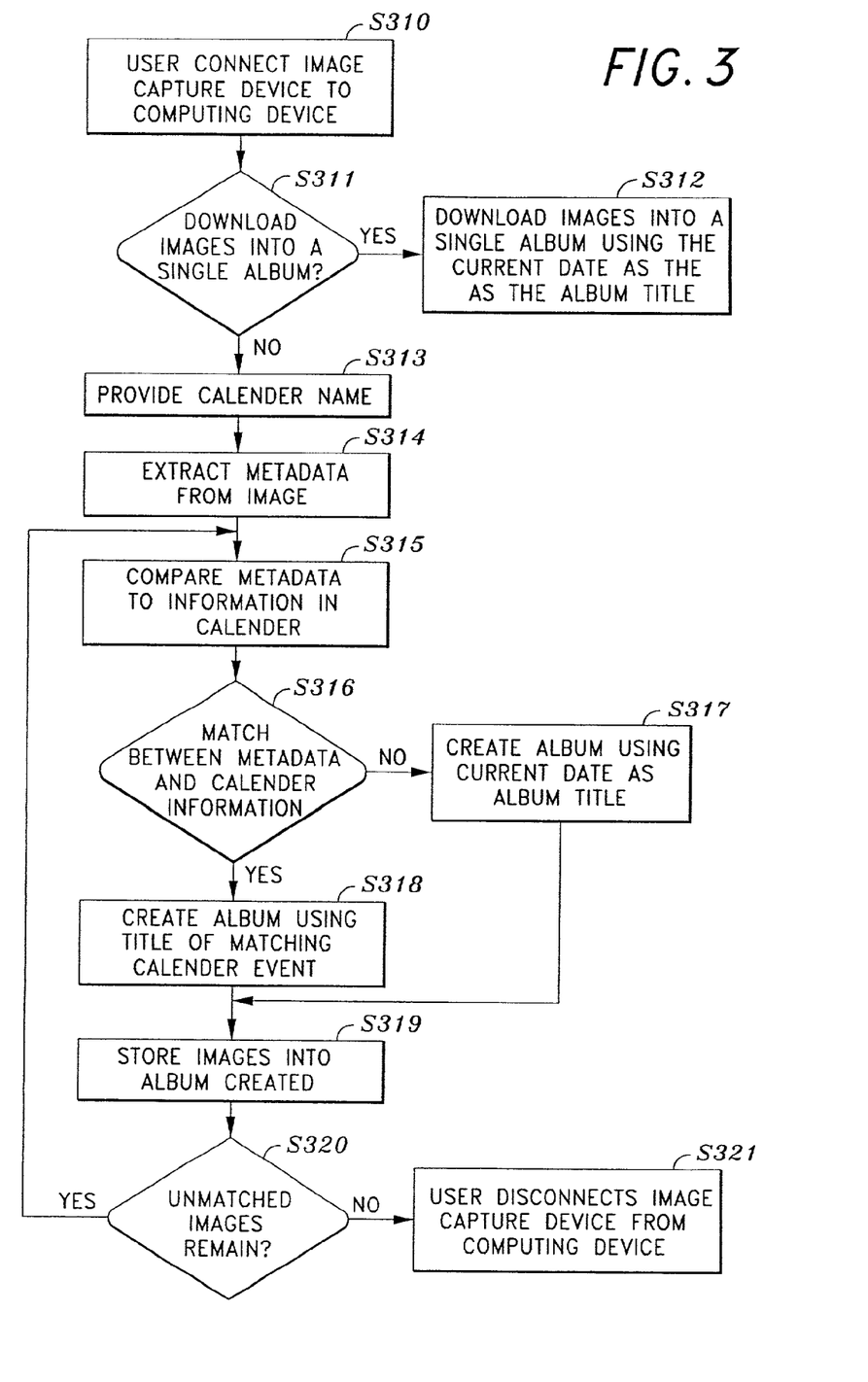
FIG. 3 is a flow diagram showing an example of steps to implement the present invention.

FIG. 3 is a flow diagram showing an example of steps to implement the present invention. In step S310, user connects image capture device 23 to computing device 10. The image capture device 23 contains images that are described by image metadata that is preferably stored along with each image. Image metadata is essentially non-picture information that is stored along with picture information in a file and can include information such as the date and time the picture was taken, whether a flash was used, which camera model was used, camera settings such as zoom and exposure, location information such as GPS-derived data, and audio annotations.

Upon connection to image capture device 23, computing device 10 recognizes the images on the image capture device 23 and prompts the user with options shown in step S311 that ask if the images are to be downloaded into a single album. This step provides a user who may wish to organize images manually, with the option of downloading the images into a single album and manually organizing those images at a later time. As shown in step S312, an affirmative response to the step S312 inquiry causes all images contained on the image capture device 23 to be stored in a single location. Preferably, the title of the resulting album is the date of the user invocation of the inventive application.

As shown in step S313, a negative response to the step S311 inquiry prompts the user for an identification of data source that the user wishes to use in organizing images. The data source is preferably a calendar, but can also be any other collection of information against which image metadata can be compared or tested, and on which basis image files may be organized. Examples of non-calendar data sources include a street map directory that stores coordinate positions and names of streets for a locality. Images could be organized by comparing the location information that is stored in the directory to image meta data that identifies location of the recorded image.

Another example of a non-calendar data source is a collection of voice recordings belonging to different people. Such recordings could be made, for example, at different dates and collected in a single recording medium such as an audiocassette tape, or be derived from a video recording captured by a camcorder at a party, for example. Images could then be organized by comparing the voice recordings contained in the data source to audio annotations stored as image metadata along with an image.

Step S313 prompts the user for the name of the data source, which is preferably a calendar, based on which user seeks to organize images stored on image capture device 23. User may use one or more calendars in organizing images. Each calendar is preferably identified by a descriptive name. Examples of such descriptive calendar names include "Dad's calendar," "Business calendar," "Family calendar," and "Sports calendar," among others.

Each calendar in turn contains one or more events, each of which are preferably identified by an event title. Examples of event titles include birthdays for specific family members like "Dad's birthday" or "Nicholas's Birthday," vacation events that correspond to vacations at specific times of the year like "Summer break," and "Spring break," vacation events that correspond to a specific location such as "New York vacation" or "Paris vacation," anniversary dates such as "10th anniversary," "Silver anniversary," and other criteria on which basis photo albums are typically organized by reference to date events.

In step S314 image metadata that is stored along with each image is extracted. Image metadata are preferably date events that identify a date and time for specific events. However, image metadata can also include other non-picture data capable of being stored along with picture information in a file, such as whether a flash was used, which camera model was used, camera settings such as zoom and exposure, etc., and audio annotations such as that correspond to voice of person who shot the image.

Image metadata can also include location information such as name of a town or city, pertaining to geographic area of image capture operation. For example, according to a process described in U.S. Pat. No. 6,160,964, image capture device 23 obtains position information from GPS satellites and converts such position information to a name of a city, town, or locale, by reference to a data base.

In step S315 image metadata is compared against information contained in the calendar identified in step S313. This step is preferably performed during downloading of images from image capture device 23 to computing device. For example, date events stored along with image as metadata are compared with dates corresponding to events specified in the calendar. Where an image meta data corresponds to more than one event on the calendar, and more than one meta data are available for the image, the other meta data are utilized to determine a storage location for that image.

For example where two events are scheduled on the calendar for the same date, and the calendar schedules events by date and time, the comparing step compares the time the image was recorded (meta data), if available, against the time of each of the calendar events on that date, and determines a location for the image accordingly. Similarly, where two events on a calendar are scheduled for the same date and time but pertain to different locations and the calendar identifies various events by date, time, and geographic location, location meta data, if available, may be compared to the location information contained in the calendar pertaining to each event, in order to determine a storage location for the image.

In step S316 an inquiry is made as to whether the comparison in step S314 resulted in a match between the image metadata and information contained in the calendar. As shown in step S318, an affirmative response to this inquiry results in the creation of an album whose title is the title of the calendar event corresponding to the match. As shown in step S317, a negative response to the step S316 inquiry results in creation of an album which uses the current date as the album title. In step S319 image is stored in either of the albums created as a result of the step S316 inquiry, depending on the result of the inquiry.

In step S319 an inquiry is made as to whether all images have been downloaded from image capture device. A negative response to this inquiry starts the process over at step S315. An affirmative response results in the user disconnecting image capture device 23 from computing device 10, per step S321.

Figure 4:
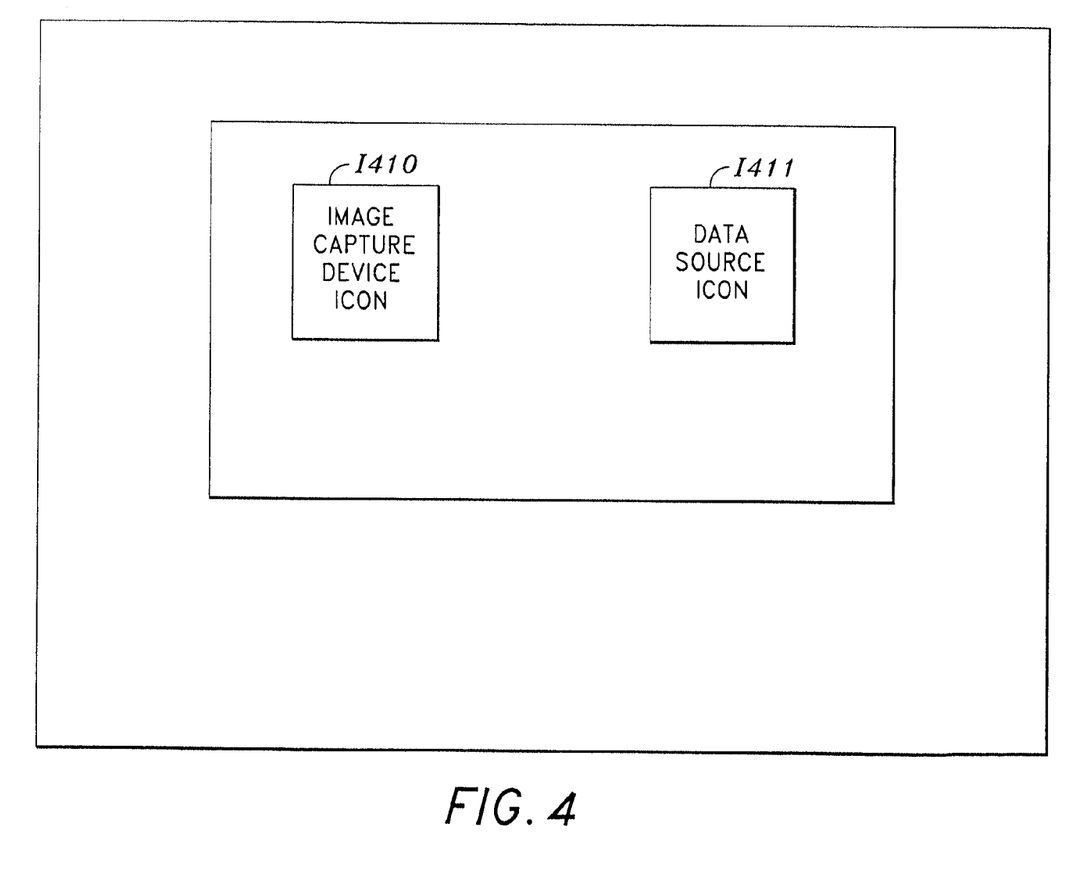
FIG. 4 is a screen shot of a display screen showing an example of icons that can help implement the present invention.

FIG. 4 is a screen shot of a display screen showing an example of icons that can help implement the present invention. Image capture device icon I410 represents image capture device 23 on which images are captured and/or stored. Image capture device is preferably a digital camera but can also include other media such as hard disks, floppy disks, CD-ROMs, and tapes, on which image data, with accompanying metadata can be stored. Stored on an image capture device along with each image is image metadata that provides information about the images.

Data source icon I411 represents a data source in which information is stored. The invention is implemented when user drags and drops icon I411 onto icon I412.

Figure 5:
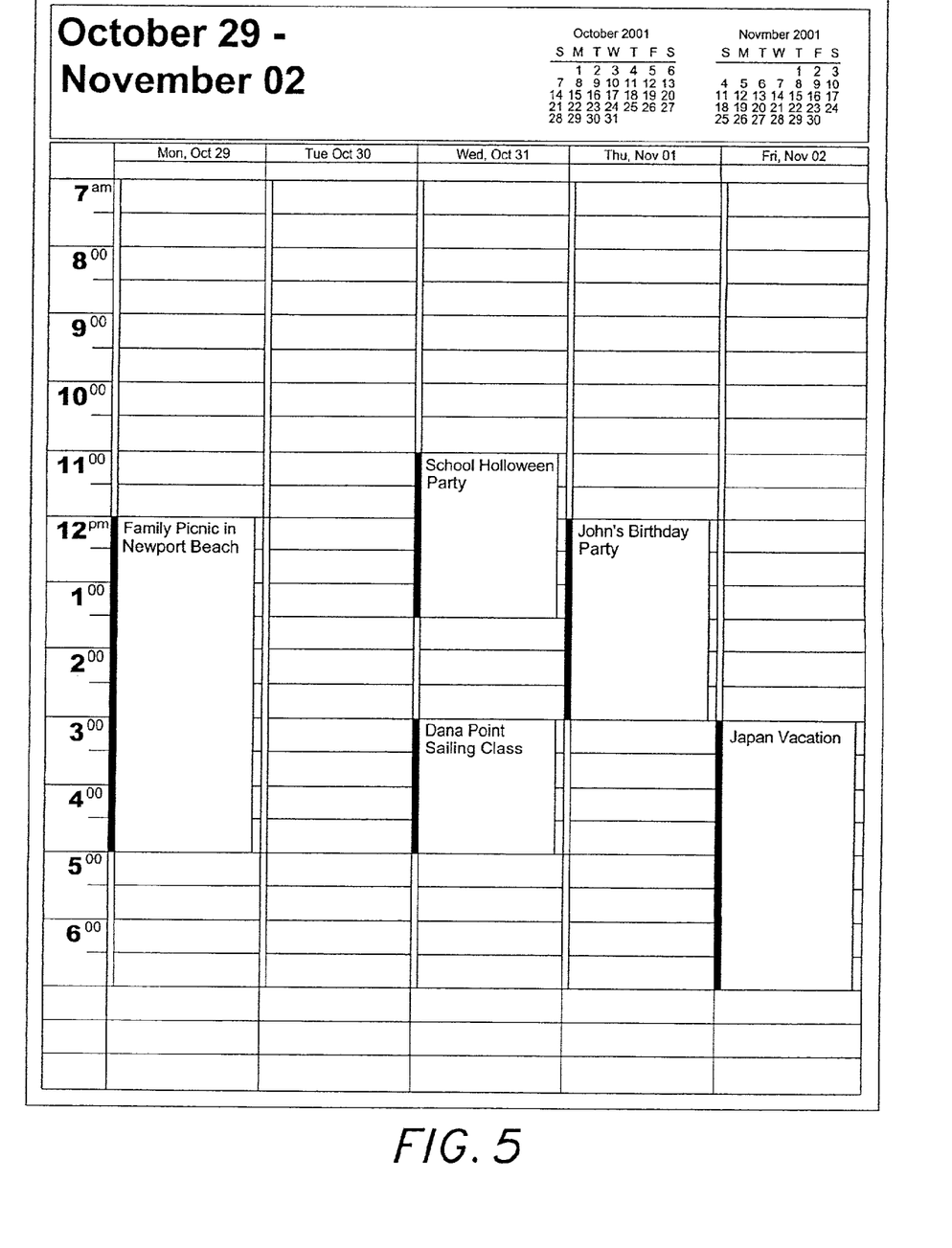
FIG. 5 shows a calendar containing dates and times of various events.

The following provides an example of the operation of the present invention. FIG. 5 shows a calendar that is an example of a data source. The calendar shown in FIG. 5 is a business calendar containing a list of work-related events and dates over the week of Oct. 29, 2001 to Nov. 02, 2001. The calendar lists six events, which are identified by event date and time.

Accordingly, the "Family Picnic in Newport Beach" event is scheduled for Monday Oct. 29, 2001 between 12:00 p.m. and 5:00 p.m. The "School Halloween Party" event is scheduled on Wednesday Oct. 31, 2001, between 11:00 a.m. and 1:30 p.m. and the "Dana Point Sailing Class"event is scheduled between 3:00 p.m. and 5:00 p.m. on the same date. The event "John's Birthday party" is scheduled for Thursday Nov. 1, 2001 between 12:00 p.m. and 3:00 p.m., and the "Japan Vacation" event starts at 3:00 p.m. on Friday Nov. 02, 2001.

Figure 6:
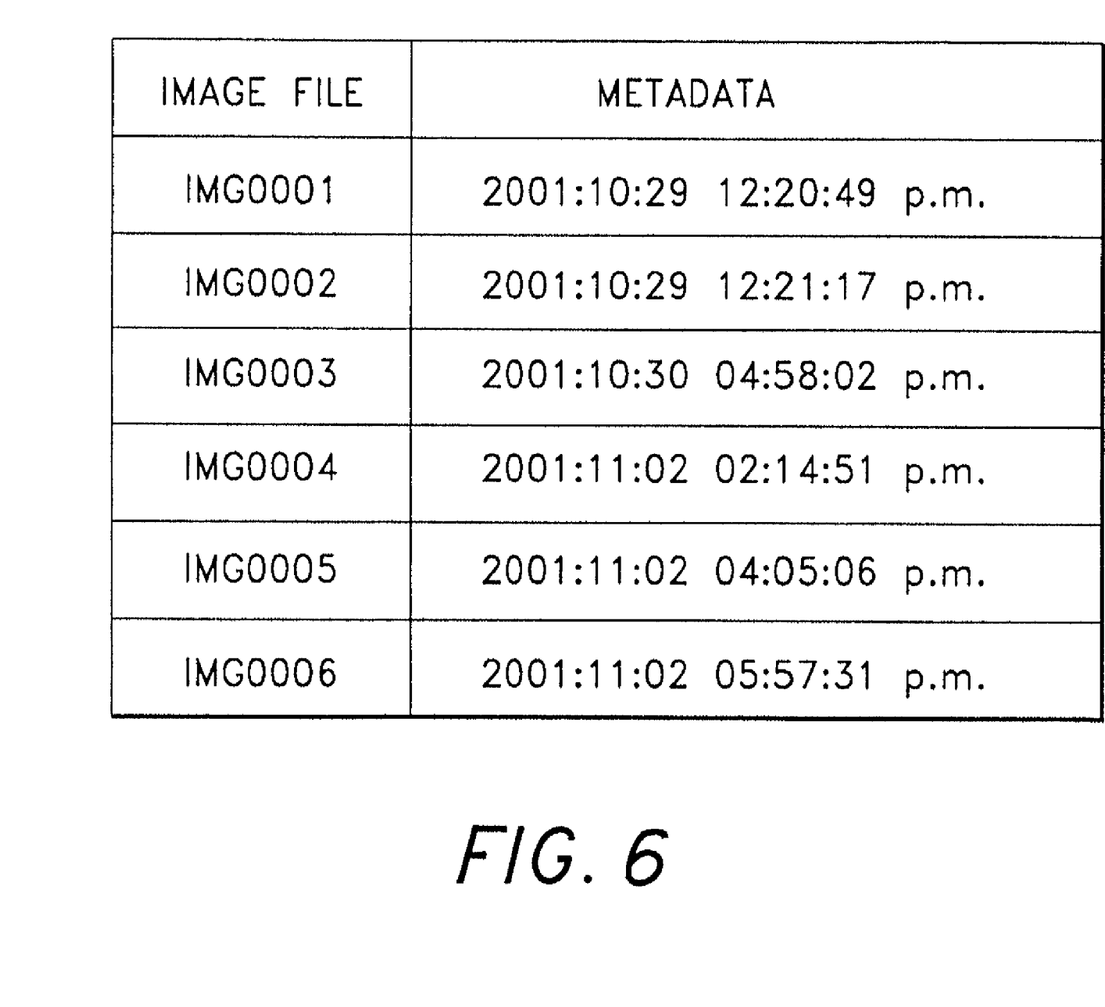
FIG. 6 is an example of image files containing image data and of image metadata that is stored along with those images.

FIG. 6 provides, in table format, an example of a number of images that are stored on image files and of image metadata stored along with those images. The Table in FIG. 6 lists a series of images that are captured by image capture device 23 as well as the meta data for those images, which in this case are the dates and times those images were recorded. The left column of the Table lists image files IMG0001, IMG0002, IMG0003, IMG0004, IMG005, and IMG006 that contain the image data. Across from each image file in each row are respectively the date and the time each image was captured, as representative metadata.

Accordingly, image file IMG0001 pertains to an image that was captured on Oct. 29, 2001 at 12:20:49 p.m. Image file IMG0002 contains an image that was captured on Oct. 29, 2001 at 12:21:17 p.m. Image file IMG0003 contains an image that was captured on Oct. 30, 2001 at 04:58:02 p.m. Image file IMG0004 contains an image that was captured on Nov. 2, 2001 at 2:14:51 p.m. IMG0005 corresponds to an image that was captured on Nov. 02, 2001 at 4:05:06 p.m., and IMG0006 contains an image that was recorded on Nov. 2, 2001 at 5:57:31 p.m.

Dragging and dropping the image capture device icon I410 onto the data source icon I411, causes the date and time information, that are stored as metadata along with image data, to be compared to the information stored in the calendar, resulting in creation of the following albums:

Album named "Family Picnic in Newport Beach" contains the following images:
  IMG0001
  IMG0002
Album that is named "Japan Vacation" contains the following images:
  IMG0005
  IMG0006

No albums are created for events "School Halloween Party," "Dana Point Sailing Class," and "John's Birthday Party" since there were no images with meta-data corresponding to those events. Conversely, IMG0003 and IMG0004 were stored in a default album whose title is the date the images were downloaded onto computing device 10, because the metadata corresponding to those images did not match that of any event stored in the calendar.

While the invention is described above with respect to what is currently considered its preferred embodiment, it is to be understood that the invention is not limited to that described above. To the contrary, the invention is intended to cover various modifications and equivalent arrangements within the spirit and scope of the appended claims.

What is claimed is:

1. A method for automatic determination of image storage location comprising:
  comparing information contained in a data source against image metadata that is stored along with the image; and
  determining a storage location of the image according to the image metadata and the information contained in the data source,
  wherein the data source comprises a collection of voice recordings belonging to various people and the image metadata is audio annotations of a person who has shot that image, wherein the comparing step uses a voice recognition technique to compare the voice recordings in the data source to the audio annotations, and the determining step stores audio annotation-corresponding images in a location whose name corresponds to one of the voice recordings.

2. A method according to claim 1, wherein the data source further comprises is a calendar and the image metadata is a creation date of the image, wherein the comparing step compares the creation date of the image against an event date specified by the calendar, and the determining step stores event-corresponding images in a location whose name corresponds to one of the events specified in the calendar.

3. A method according to claim 1, wherein the data source further comprises a calendar and the image metadata is a creation time and date of the image, wherein the comparing step compares the creation time and date of the image against an event time and date specified by the calendar, and the determining step stores event-corresponding images in a location whose name corresponds to one of the events specified in the calendar.

4. A method according to claim 1, wherein the data source further comprises a calendar and the image metadata is a geographic location associated with the image, wherein the comparing step compares the metadata geographic location information against geographic location information specified in the calendar, and the determining step stores location-corresponding images in a location whose name corresponds to one of the geographic locations specified in the calendar.

5. A method according to claim 1, wherein the data source further comprises a street address directory containing location coordinates and corresponding street addresses of a locality, and the image metadata is a location coordinate associated with the image, wherein the comparing step compares the location coordinates stored in the directory with the metadata and the determining step stores street address-corresponding images in a location whose name corresponds to one of the street addresses specified in the street address directory.

6. A method according to claim 1, wherein images whose metadata does not match information contained in the data source is stored in a default location.

7. A method according to claim 1, wherein the data source further contains information about specific events on which basis photo images may be organized.

8. A method according to claim 7, wherein the information about specific events includes a title that identifies the event.

9. A method according to claim 8, wherein image is stored in a location that is identified by the event title.

10. A method according to claim 8, wherein images whose metadata does not correspond to an identifying title is stored in a default location.

11. Computer-executable process steps stored on a computer readable medium, said computer-executable process steps for automatic determination of image storage location, said computer-executable process steps comprising process steps executable to perform a method according to any of claims 1 to 5 and 8 to 10.

12. A computer-readable memory medium in which computer-executable process steps are stored, said computer-executable process steps for performing automatic determination of image storage location, wherein the process steps comprise:

a comparing step for comparing information contained in a data source against image metadata that is stored along with the image; and a determining step for determining a storage location of the image according to the image metadata and the information contained in the data source, wherein the data source comprises a collection of voice recordings belonging to various people and the image metadata is audio annotations of a person who has shot that image, wherein the comparing step uses a voice recognition technique to compare the voice recordings in the data source to the audio annotations, and the determining step stores audio annotation-corresponding images in a location whose name corresponds to one of the voice recordings.

* * * * *

UNITED STATES PATENT AND TRADEMARK OFFICE
CERTIFICATE OF CORRECTION

PATENT NO. : 7,009,643 B2  Page 1 of 1
APPLICATION NO. : 10/098134
DATED : March 7, 2006
INVENTOR(S) : Kaoru Nakamura It is certified that error appears in the above-identified patent and that said Letters Patent is hereby corrected as shown below:

COVER PAGE:
(57) ABSTRACT
Line 15, "the" should be deleted.

COLUMN 4:
Line 30, "person" should read -- the person --; and
Line 48, "example" should read -- example, --.

COLUMN 6:
Line 41, "is" (first occurrence) should be deleted;
Line 41, "is" (second occurrence) should read -- comprises --; and
Lines 48 and 56, "is" should read -- comprises --.

COLUMN 7:
Line 25, "1 to 5 and 8 to 10." should read -- 1 to 10. --.

Signed and Sealed this

Fifteenth Day of May, 2007

JON W. DUDAS
*Director of the United States Patent and Trademark Office*